(12) United States Patent
White

(10) Patent No.: US 9,292,846 B2
(45) Date of Patent: Mar. 22, 2016

(54) MOBILE DEVICE AUTHORIZATION SYSTEM FOR CONCURRENT SUBMISSION OF MULTIPLE TENDER TYPES

(75) Inventor: William O. White, Boulder, CO (US)

(73) Assignee: Mocapay, Inc., Denver, CO (US)

( * ) Notice: Subject to any disclaimer, the term of this patent is extended or adjusted under 35 U.S.C. 154(b) by 941 days.

(21) Appl. No.: 13/305,481

(22) Filed: Nov. 28, 2011

(65) Prior Publication Data

US 2013/0138516 A1    May 30, 2013

(51) Int. Cl.
| | |
|---|---|
| G06Q 20/00 | (2012.01) |
| G06Q 30/00 | (2012.01) |
| G07B 17/00 | (2006.01) |
| G07F 19/00 | (2006.01) |
| G06Q 20/20 | (2012.01) |
| G06Q 20/32 | (2012.01) |
| G06Q 20/38 | (2012.01) |
| G06Q 20/40 | (2012.01) |
| G06Q 20/42 | (2012.01) |

(52) U.S. Cl.
CPC ............ *G06Q 20/204* (2013.01); *G06Q 20/325* (2013.01); *G06Q 20/3278* (2013.01); *G06Q 20/385* (2013.01); *G06Q 20/4012* (2013.01); *G06Q 20/425* (2013.01)

(58) Field of Classification Search
CPC ... G06Q 40/10; G06Q 40/02; G06Q 30/0263; G06Q 30/0267
USPC ........... 705/14.51, 14.64, 17, 26.1, 30, 39, 44
See application file for complete search history.

(56) References Cited

U.S. PATENT DOCUMENTS

| | | | |
|---|---|---|---|
| 7,571,468 B1 * | 8/2009 | Williams | G06F 21/34 713/184 |
| 2006/0178986 A1 * | 8/2006 | Giordano | G06Q 20/04 705/40 |

(Continued)

*Primary Examiner* — Olusegun Goyea
(74) *Attorney, Agent, or Firm* — Holland & Hart LLP

(57) ABSTRACT

Methods, systems, and devices are described for providing mobile device transaction approvals utilizing multiple forms of tender. An identifier of a mobile device and a request for a transaction authorization may be transmitted from a mobile device and received at a payment authority system. The payment authority system may generate a payment code for transmission to the mobile device. The payment code may be provided to a point of sale (POS) system. The POS system may transmit a transaction amount, an identifier of a merchant, and the payment code to the payment authority system. A number of forms of tender may be applied to the transaction amount. The payment authority system may generate a unified approval code applying the multiple forms of tender to the transaction. The unified approval code may be transmitted to the POS system and applied to a transaction.

15 Claims, 12 Drawing Sheets

(56) References Cited

U.S. PATENT DOCUMENTS

| | | | | |
|---|---|---|---|---|
| 2008/0015987 | A1* | 1/2008 | Ramavarjula | G06Q 20/10 705/44 |
| 2008/0313047 | A1* | 12/2008 | Casares | G06Q 20/10 705/17 |
| 2008/0319914 | A1* | 12/2008 | Carrott | G06Q 20/02 705/75 |
| 2009/0063312 | A1* | 3/2009 | Hurst | G06Q 20/105 705/30 |
| 2009/0065572 | A1* | 3/2009 | Jain | G06K 19/07739 235/379 |
| 2009/0090783 | A1* | 4/2009 | Killian | G06Q 20/0855 235/492 |
| 2009/0192913 | A1* | 7/2009 | Saito | G06Q 20/20 705/26.1 |
| 2009/0228336 | A1* | 9/2009 | Giordano | G06Q 20/04 705/75 |
| 2010/0010906 | A1* | 1/2010 | Grecia | G06Q 20/102 705/21 |
| 2010/0174620 | A1* | 7/2010 | Stringfellow | G06Q 20/02 705/26.1 |
| 2010/0217674 | A1* | 8/2010 | Kean | G06Q 20/204 705/17 |
| 2011/0022472 | A1* | 1/2011 | Zon | G06Q 20/10 705/14.64 |
| 2011/0087592 | A1* | 4/2011 | van der Veen | G06Q 20/12 705/44 |
| 2011/0215159 | A1* | 9/2011 | Jain | G06K 19/07739 235/492 |
| 2011/0251892 | A1* | 10/2011 | Laracey | G06Q 30/0253 705/14.51 |
| 2011/0288967 | A1* | 11/2011 | Selfridge | G06Q 20/00 705/30 |
| 2011/0320345 | A1* | 12/2011 | Taveau | G06Q 20/32 705/39 |
| 2012/0130787 | A1* | 5/2012 | Stouffer | G06Q 20/28 705/14.17 |
| 2012/0209749 | A1* | 8/2012 | Hammad | G06Q 30/06 705/27.1 |

* cited by examiner

MOBILE DEVICE AUTHORIZATION SYSTEM FOR CONCURRENT SUBMISSION OF MULTIPLE TENDER TYPES

BACKGROUND

The present invention relates to the use of a wireless device, such as a cell phone, to pay for transactions in general and, in particular, to utilizing multiple forms of tender as part of a transaction.

As contactless payment systems have become more common, there has been a push to enable contactless payment of transactions via a consumer's cell phone. As with contactless payment cards, cell phones may be equipped with a short-range Radio Frequency Identification (RFID) chip or other near-field communication devices. A wallet application may be downloaded to the cell phone and a dollar amount is stored in the wallet. To pay for a transaction, the consumer may then simply wave their cell phone within a few inches of a special display found in stores that accommodate such a payment mechanism. The special display may include an RFID reader that can access the wallet and deduct the appropriate amount via the RFID chip on the cell phone.

Such systems may have drawbacks. For example, rolling out machines that interface with a cell phone and accept dollars can add significant infrastructure cost for the cell phone carrier or financial institution in charge of the system. Further, seeking out such machines can be time consuming and/or inconvenient, and may limit adoption. Further, downloading applications and enrolling services may also limit adoption if the consumer feels that it is too complicated or too time consuming. Another drawback to such systems may be the lack of authentication. In addition, such systems may only utilize an individual form of tender, such as an individual credit card, for a given transaction.

SUMMARY

Methods, systems, and devices are described for providing mobile device transaction approvals utilizing multiple forms of tender for a transaction. In one example, an identifier of a mobile device and/or a request for a transaction authorization may be transmitted from a mobile device and received at a payment authority system. The payment authority system may generate a payment code for transmission to the mobile device. The payment code may be provided to a point of sale (POS) system by the mobile device. The POS system may transmit a transaction amount, an identifier of a merchant, and the payment code to the payment authority system. A number of forms of tender may be applied to the transaction amount. The payment authority system may generate a unified approval code applying the multiple forms of tender to the transaction. The unified approval code may be transmitted to the POS system and applied to a transaction.

In some embodiments, a user of the mobile device may provide preferences regarding applying the multiple forms of tender selected from a group of tender forms that may be applied to a given transaction. The user preferences may be generally applicable to transactions or merchant specific in some cases. The user may provide preference information at different times including before initiating a transaction or during a transaction, for example. In some cases, a merchant may provide forms of tender, such as coupons or loyalty cards, which may be utilized as one of the multiple forms of tender utilized for a transaction.

Some embodiments include a method of mobile device transaction approval applying multiple forms of tender. The method may include receiving an identifier of a mobile device and a request for a transaction authorization. A payment code for transmission to the mobile device may be generated in response to receiving the mobile device identifier and the request for the transaction authorization. A transaction amount, an identifier of a merchant, and the payment code from a point of sale (POS) system may be received. The multiple forms of tender may be applied to the transaction amount. A unified approval code applying the multiple forms of tender to the transaction may be generated for transmission to the POS system.

Applying the multiple forms of tender to the transaction amount may include automatically applying the multiple forms of tender to the transaction amount according to preset preferences of a user of the mobile device.

Some embodiments of the method of mobile device transaction approval may further include transmitting a user interface to a user of the mobile device to select preferences relating to forms of tender to be applied. Selected preferences from the user of the mobile device may be received, where applying the multiple forms of tender to the transaction amount includes applying the multiple forms of tender to the transaction amount according to selected preferences. Transmitting the user interface may include transmitting the user interface in response to receiving the request for a transaction authorization. Receiving the selected preferences may occur before generating the payment code.

Applying the multiple forms of tender to the transaction amount may include automatically applying the multiple forms of tender to the transaction amount at least in part according to preset preferences of the merchant. Some embodiments may further include offering an additional form of tender to the user of the mobile device in response to receiving the merchant identifier and according to preset preferences of the merchant.

The multiple forms of tender may include at least a credit card, a debit card, a gift card, a prepaid card, a coupon, a digital currency, or a loyalty card. The unified approval code applying the multiple forms of tender to the transaction may result in an amount less than the transaction amount, and an additional amount remains due. The request for the transaction authorization may include information identifying the merchant.

Some embodiments of the method of mobile device transaction approval may further include transmitting the payment code to the mobile device. The unified approval code may be transmitted to the point of sale (POS) system.

Some embodiments include a payment authority system for mobile device transaction approvals. The system may include: a first interface configured to receive a mobile device identifier and a request for a transaction authorization; a mobile device payment code module, in communication with the first interface, and configured to generate a payment code for transmission to the mobile device; a second interface configured to receive a transaction amount, a merchant identifier, and the payment code from a point of sale (POS) system; and/or a POS approval code module, in communication with the second interface, and configured to: apply multiple forms of tender to the transaction amount; and/or generate a unified approval code applying the multiple forms of tender to the transaction for transmission to the POS system.

The point of sale (POS) approval code module may automatically apply the multiple forms of tender to the transaction amount according to preset preferences of a user of the mobile device. The point of sale (POS) approval code module may be further configured to: transmit a user interface to a user of the mobile device to select preferences relating to forms of tender to be applied; and/or receive selected preferences from the user of the mobile device, where applying the multiple forms of tender to the transaction amount includes applying the multiple forms of tender to the transaction amount according to selected preferences. The point of sale (POS) approval code module may transmit the user interface in response to receiving the request for a transaction authorization and/or may receive the selected preferences before generating the payment code.

The point of sale (POS) approval code module may automatically apply the multiple forms of tender to the transaction amount at least in part according to preset preferences of the merchant. The point of sale (POS) approval code module may be further configured to offer an additional form of tender to the user of the mobile device in response to receiving the merchant identifier and according to preset preferences of the merchant.

Some embodiments include a method of mobile device transaction approvals applying multiple forms of tender. The method may include transmitting a transaction authorization request and a mobile device identifier. A unified payment code may be received in response to the request for authorization. The unified payment code may be formatted to apply the multiple forms of tender to a transaction amount. The unified payment code may be provided to a point of sale (POS) system.

The method of mobile device transaction approvals may further include transmitting preset preferences for applying the multiple forms of tender of a user of the mobile device. The method of mobile device transaction approvals may further include receiving, in response to transmitting the request for the transaction authorization, a user interface identifying options for selecting preferences relating to forms of tender to be applied and/or transmitting selected preferences from the user of the mobile device.

The options for selecting preferences may include forms of tender provided by a merchant for a transaction associated with the transaction amount.

Some embodiments may include method of mobile device transaction approvals applying multiple forms of tender. The method may include receiving a payment code from a user of a mobile device. A transaction amount, a merchant identifier, and the payment code from a point of sale (POS) system may be transmitted. A unified approval code applying multiple forms of tender to the transaction amount may be received.

The unified approval code applying the multiple forms of tender to the transaction may be for an amount less than the transaction amount, and an additional amount remains due. Some embodiments may further include transmitting a request for an additional form of tender and/or receiving the additional form of tender to cover the additional amount due.

The unified approval code applying the multiple forms of tender to the transaction may be for an amount less than the transaction amount due to an application of a discount. Applying multiple forms of tender to the transaction amount may include automatically applying the multiple forms of tender to the transaction amount at least in part according to preset preferences of a merchant associated with the point of sale (POS) system.

Some embodiments may further include utilizing the unified approval code to apply the multiple forms of tender to the transaction amount and/or providing a receipt to a user of the mobile device itemizing the application of each of the multiple forms of tender to the transaction amount.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Methods, systems, and devices are described for providing mobile device transaction approvals utilizing multiple forms of tender for a transaction. An identifier of a mobile device and/or a request for a transaction authorization may be transmitted from a mobile device and received at a payment authority system. The payment authority system may generate a payment code for transmission to the mobile device. The payment code may be provided to a point of sale (POS) system. The POS system may transmit a transaction amount, an identifier of a merchant, and the payment code to the payment authority system. A number of forms of tender may be applied to the transaction amount. The payment authority system may generate a unified approval code applying the multiple forms of tender to the transaction. The unified approval code may be transmitted to the POS system and applied to a transaction.

For example, a user of the mobile device may provide preferences regarding applying the multiple forms of tender selected from a group of tenders that may be applied to a given transaction. The user preferences may be generally applicable to transactions or merchant specific in some cases. The user may provide preference information at different times including before initiating a transaction or during a transaction, for example. In some cases, a merchant may provide forms of tender, such as coupons or loyalty cards, which may be utilized as one of the multiple forms of tender utilized for a transaction.

Figure 1:
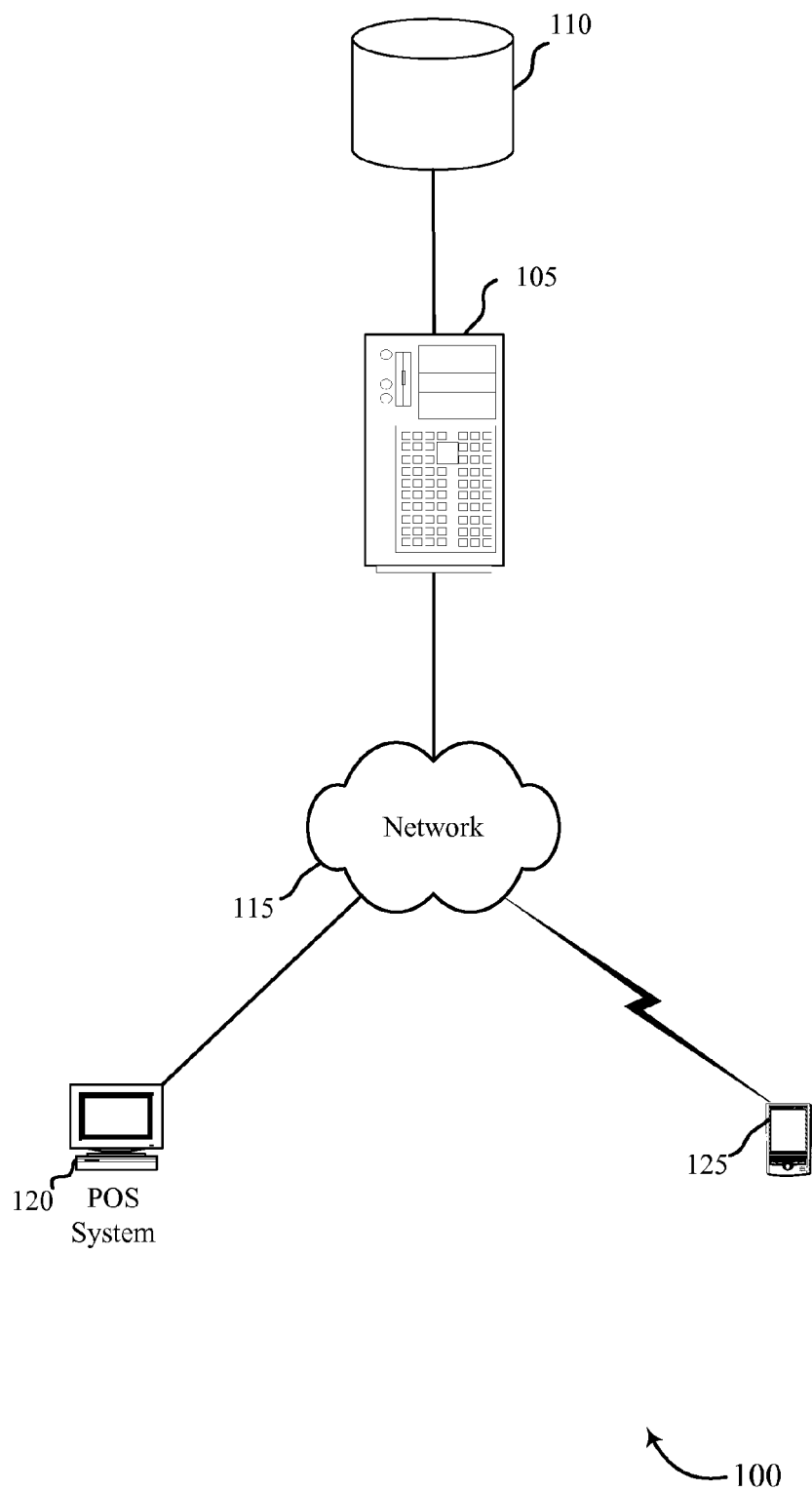
FIG. 1 is a diagram of a payment transaction system in accordance with various embodiments.

Turning first to FIG. 1, a payment transaction system 100 configured in accordance with various embodiments is shown. System 100 includes network 115, which interconnects one or more point of sale (POS) systems 120, one or more mobile devices 125 and payment authority system 105. Payment authority system 105 may be coupled with data store 110. In some embodiments, network 115 includes, but is not necessarily limited to, the Internet. A POS system 120 may include one or more POS devices that may be utilized, for example, by a merchant or service provider that may sell goods, services, or both at traditional brick-and-mortar stores, on-line, or both at traditional brick-and-mortar stores and on-line. In some cases, mobile devices 125 may communicate with network 115 through a wireless carrier (not shown).

A mobile device 125 associated with a particular user can communicate with the various nodes of network 115. For example, the user can use a mobile device 125 to purchase goods or services from a merchant associated with a point of sale (POS) system 120 by interacting with payment authority system 105 over network 115 in a manner that will be explained below. Depending on the particular embodiment, the mobile device 125 can be a cellular telephone, Personal Communication Service (PCS) phone, Personal Digital Assistant (PDA), or other portable communication device. In some embodiments, a user may also utilize other communication devices, such as a portable or desktop computer (not shown), to communicate with the various nodes of network 115.

Payment authority system 105 can be configured to establish and maintain user accounts. Thus for example, a user can log-on to payment authority system 105 using their mobile device 125, or personal computer in some cases, and establish a user account. A user can select from a variety of different tenders (forms of payment) that may be utilized in different combinations for different types of transactions for example.

A user may establish one or more accounts on a payment authority system 105 in accordance with various embodiments. For example, a user can access the payment authority system 105 to establish an account. In certain embodiments, the user can access the payment authority system 105 via a homepage on the worldwide web. Depending on the embodiment, the user can access the homepage using their computer and/or their mobile device, such as the mobile device 125.

The user can supply a user name and password. For example, the user can be asked to generate a unique user name and password. In certain other embodiments, however, the user's user name can be the user's mobile device identifier, e.g., the user's mobile device's ten-digit telephone number. Further, the user can be asked to generate a unique password, or the password can be generated by the system. For example, in one embodiment, the user's password is sent to the user's mobile device. Thus, the password may be the password the user received on the user's mobile device. This can help verify the user's mobile device identifier.

The user may provide information regarding multiple forms of tender that the user wishes to utilize through the payment authority system 105. The forms of tender included in the tender module 330 of FIG. 3 described below may include, but are not limited to, credit cards, debit cards, gift cards, prepaid cards, coupons, loyalty cards, and/or digital currencies. As discussed in more detail below, the user may provide user preferences with regard to the use of the multiple forms of tender. In general, two or more forms of tender may be applied to any given transaction utilizing system 100 as discussed in more detail below.

The payment authority system 105 may establish one or more accounts on the system for a user. For example, the payment authority system 105 may receive the user name and password and establish an account record. In some cases, accounts may be set up with groups of the multiple forms of tender associated with each account. Such information may be stored on data store 110. The payment authority system 105 may receive the user's mobile communication device identifier if it has not already been received. In some embodiments, the payment authority system 105 may utilize a personal identification number (PIN) that either the payment authority system 105 or the user generates. The PIN may be utilized as an added means of verifying a user using the mobile device 125.

The mobile device 125 may transmit information to payment authority system 105 utilizing a variety of different known techniques including but not limited to, Short Message Service (SMS) messages, Multimedia Message Service (MMS) messages, Wireless Access Protocol (WAP), an application, or voice to obtain one-use perishable payment codes from payment authority 105 in making payments from any of a variety of different tenders. A user may utilize the mobile device 125 that can also use a variety of methods, including the above examples, to provide the one-use perishable unified approval codes to a merchant's point of sale (POS) system 120 in making electronic purchases.

Network 115 may also include a cellular communication network such as a GSM network, CDMA network, a 3G network, etc. Further, it will be understood that the various other components of system 100 can communicate using the associate's network or networks, including the Internet and worldwide web. For example, the other components can communicate via one or more wired or wireless Metropolitan Area Networks (MANs), one or more wired or wireless Wide Area Networks (WANs), one or more wired or wireless Local Area Networks (LANs), one or more Personal Area Networks (PANs), etc. Further, it will be understood that the various components are configured to communicate using the requisite communication protocols and signal schemes.

When a user utilizes the mobile device 125 to make a purchase, the mobile device 125 contacts payment authority system 105 to utilize any of a variety of access methods (e.g., SMS, MMS, WAP or other browser technology, application, voice). An identifier of the mobile device 125 and a request for a transaction authorization may be transmitted from the mobile device and received at the payment authority system 105. The payment authority system 105 may generate a payment code for transmission to the mobile device 125. In some cases, the payment code is transmitted through the network 115 to the mobile device 125.

The user may then present the payment code to a merchant when making a purchase of goods or services from the merchant. For example, the payment code may be provided to the point of sale (POS) system 120 of the merchant when making a purchase. The payment code may be a one-time perishable (time-limited) payment code. The POS system 120 may transmit a transaction amount for the purchase, an identifier of the merchant, and the payment code to the payment authority system 105. The payment authority system 105 may then apply a number of forms of tender to the transaction amount. The payment authority system 105 may generate a unified approval code applying the multiple forms of tender to the transaction. The unified approval code may be transmitted to the POS system 120 and applied to a transaction. More details regarding these aspects in accordance with various embodiments are described below.

A user of the mobile device 125 may provide preferences regarding how to select multiple forms of tender from a group of tenders that may be applied to a given transaction. The user may utilize the mobile device 125 to provide their preferences to the payment authority system 105 so that the preferences may be applied to different transactions. In some cases, the payment authority system 105 may generate user interfaces that may be transmitted to the mobile device 125 such that the user may select preferences. In some cases, some preferences may be preset, such as when a user sets up an account with the payment authority system 105.

The user preferences may be generally applicable to transactions or merchant specific in some cases. The user may provide preference information at different times including before initiating a transaction or during a transaction, for example. In some cases, a merchant may provide forms of tender, such as coupons or loyalty cards, which may be utilized as one of the multiple forms of tender utilized for a transaction. For example, when a customer provides a payment code to the point of sale (POS) system 120 of a merchant, the POS system 120 may present additional forms of tender to the user, such as a special offer in the form of a tender that may be applied also to the transaction. This tender may be transmitted to the payment authority system 105 along with other information, which the payment authority system 105 may utilize in generating a unified approval code that may apply multiple forms of tender. More details regarding these aspects in accordance with various embodiments are described below.

The payment authority system 105 may include a rules engine, a session manager, and/or a print router in some embodiments. The payment authority system 105 may be made up of one or more server computers, workstations, web servers, or other suitable computing devices. The payment authority system 105 may be fully located within a single facility or distributed geographically, in which case a network may be used to integrate different components.

The data store 110 may be a single database, or may be made up of any number of separate and distinct databases. The data store 110 may include one or more relational databases or components of relational databases (e.g., tables), object databases, or components of object databases, spreadsheets, text files, internal software lists, or any other type of data structure suitable for storing data. Thus, it should be appreciated that a data store 110 may each be multiple data storages (of the same or different type), or may share a common data storage with other data stores. Although in some embodiments the data store 110 may be distinct from a payment authority system 105, in other embodiments it may be integrated therein to varying degrees.

Figure 2:
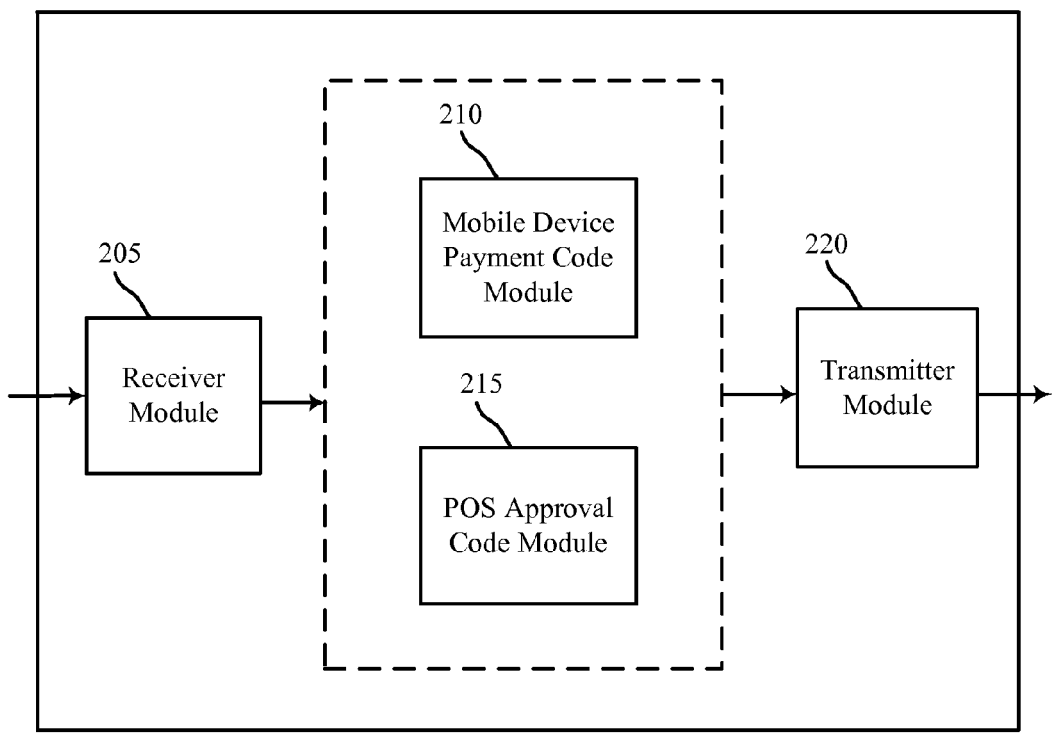
FIG. 2 is a block diagram of a payment authority system in accordance with various embodiments.

FIG. 2 is a simplified block diagram of a payment authority system 200. This system 200 may be part of the payment authority system 105 of FIG. 1. System 200 may include a receiver module 205, a mobile device payment code module 210, a point of sale (POS) approval code module 215, and/or a transmitter module 220.

A receiver module 205 may be configured to receive information from a mobile device, such as mobile device 125 of FIG. 1, and/or from a point of sale (POS) system, such as the POS system 120 of FIG. 1. For example, the receiver module 205 may receive an identifier of a mobile device and a request for a transaction authorization from a mobile device. In some cases, the receiver module 205 may also receive information regarding a merchant, for example, when a user of the mobile device is seeking to make a purchase from a specific merchant as part of the transaction authorization. The mobile device payment code module 210 may then generate a payment code for transmission to the mobile device in response to receiving the mobile device identifier and the request for the transaction authorization. The transmitter module 220 may then transmit the payment code. In some cases, the transmitter module 220 may transmit the payment code through a network, such as the network 115 of FIG. 1. The mobile device may then receive the payment code, which the user may then utilize in making a purchase at a POS system.

The receiver module 205 may also receive a transaction amount, an identifier of a merchant, and the payment code from a point of sale (POS) system. A user of a mobile device that has received the payment code, for example, may provide the payment code to a merchant with the POS system as part of a purchase of goods or services from the merchant. The POS approval code module 215 may then apply a number of forms of the tender transaction amount. The POS approval code module 215 may generate a unified approval code applying the multiple forms of tender to the transaction for transmission to the POS system. The transmitter module 220 may then transmit the unified approval code such that the POS system may receive the unified approval code. The POS system may then apply the unified approval code to the purchase being made by the customer. The unified approval code may provide instructions to the POS system such that the POS system may apply the multiple different forms of tender to the transaction.

The point of sale (POS) approval code module 215 may be configured to automatically apply multiple forms of tender to the transaction amount according to preset preferences of a user of the mobile device. For example, a user may have provided information to the payment authority system 200 providing the user's preferences with regard to the different forms of tender the user would like applied for one or more different types of transactions. These preferences generally involve multiple forms of tender that either the user or another, such as a merchant or the POS system, for example, has provided that are associated with the user's account. These preset preferences may be provided before a transaction with a merchant may have occurred.

In some situations, the transmitter module 220 may transmit a user interface to a user of the mobile device to select preferences relating to forms of tender to be applied to one or more transactions. This user interface may be transmitted to the mobile device of the user, for example, when the user is requesting a transaction authorization and providing an identifier of the user's mobile device. The user interface may be transmitted to the mobile device without the need for a request for a transaction in some cases. The point of sale (POS) approval code module 215 may then receive the selected preferences before generating a payment code. In other cases, the user interface may be transmitted to the mobile device of the user after the mobile device payment code module 210 has generated a payment code. For example, the user interface may be transmitted to a user of the mobile device after the POS approval code module 215 has received a transaction amount, a merchant identifier, and the payment code from a POS system. The POS approval code module 215 may apply multiple forms of tender to the transaction amount according to selected preferences. The POS approval code module 215 may then generate a unified approval code based on the user's selected preferences.

The point of sale (POS) approval code module 215 may utilize preferences of a merchant in applying the multiple forms of tender to a transaction amount. For example, the POS approval code module 215 may offer an additional form of tender from the merchant to the user of the mobile device in response to receiving the merchant identifier and according to preset preferences of the merchant. In some situations, these merchant preferences may be presented to the user as part of the user interface.

The point of sale (POS) approval code module 215 may apply different forms of tender to a transaction amount. The multiple forms of tender may include, but are not limited to, credit cards, debit cards, gift cards, prepaid cards, coupons, digital currencies, and/or loyalty cards.

In some cases, when the point of sale (POS) approval code module 215 generates a unified approval code applying the multiple forms of tender, the result may be an amount less than the transaction amount. In some cases, there may be a remainder due. The POS approval code module 215 may generate a message to send to a POS system prompting a merchant to request an additional form of tender from a customer to complete a transaction.

Figure 3:
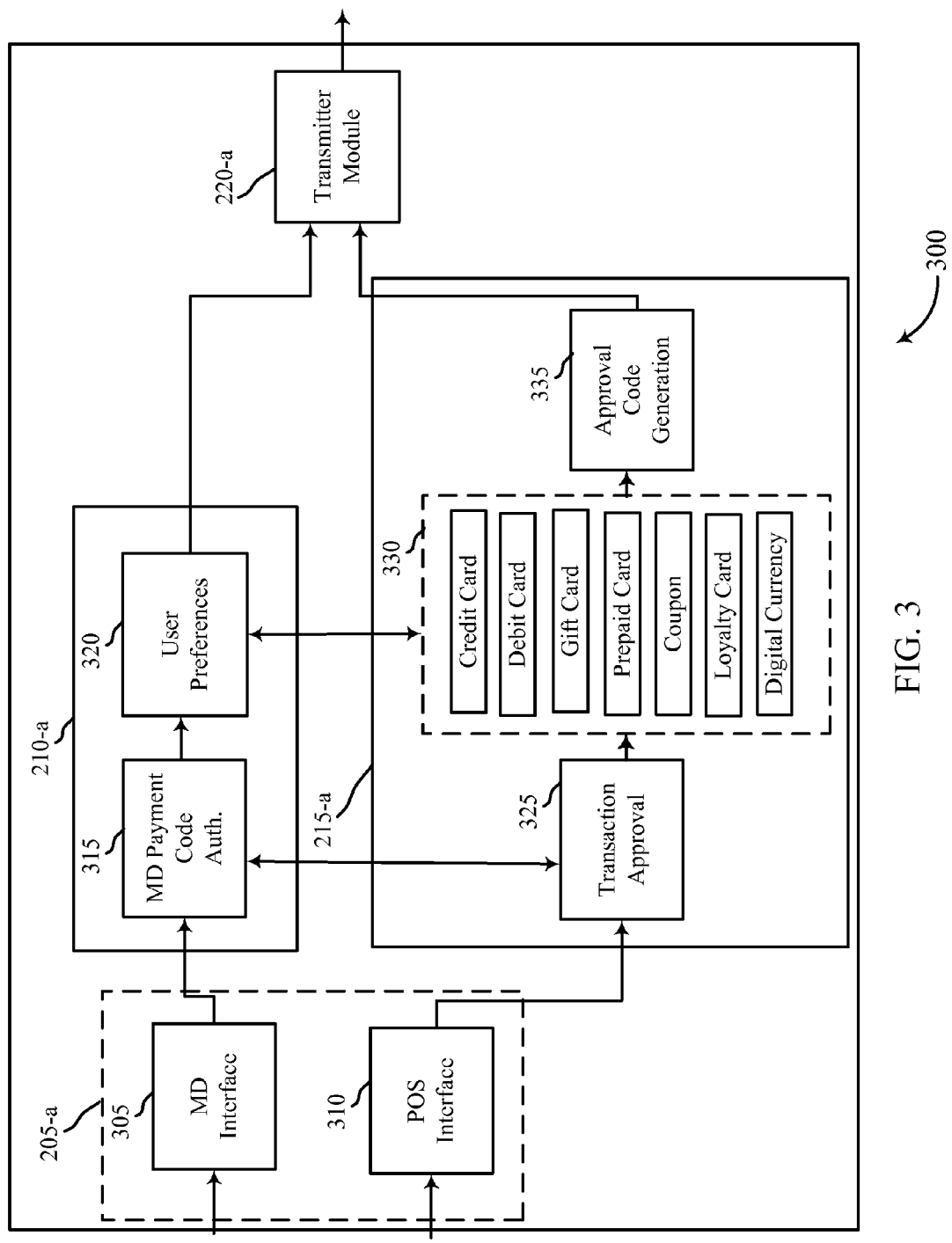
FIG. 3 is a block diagram of a payment authority system in accordance with various embodiments.

FIG. 3 is a detailed block diagram of a payment authority system 300 in accordance with various embodiments. The system 300 may be in whole or in part the system 200 of FIG. 2 or the system 105 of FIG. 1, for example.

A receiver module 205-a of the system 300 may provide an example of the receiver module 205 of FIG. 2. The receiver module 205-a may receive information from a mobile device, such as the mobile device 125 of FIG. 1 through a mobile device (MD) interface 305. The receiver module 205-a may also receive information from a point of sale (POS) system, such as the POS system 120 of FIG. 1, through a POS interface 310.

The MD interface 305 may be configured to receive an identifier of a mobile device and a request for a transaction authorization from the mobile device. The request for the transaction authorization, for example, may include a request for a payment code. Receiving the identifier of the mobile device may provide sufficient information to constitute a request for the transaction authorization. The request for the transaction authorization may also include information identifying a specific merchant for which the transaction authorization is being requested. The MD interface 305 may transmit the information such as the identifier of the mobile device and the request for a transaction authorization to a mobile device (MD) payment code authorization module 315 that is part of the mobile device payment code module 210-a. The mobile device payment code module 210-a may provide an example of the mobile device payment code module 210 of FIG. 2. The mobile device payment code module 210-a may also include a user preferences module 320.

The MD payment code authorization module 315 may generate a payment code that may then be transmitted to the transmitter module 220-a for transmission. The transmitter module 220-a may provide an example of the transmitter module 220 of FIG. 2. The transmitter module 220-a may then transmit the payment code. In some cases, the transmitter module 220-a may transmit the payment code through a network, such as the network 115 of FIG. 1. The mobile device may then receive the payment code, which the user may then utilize in making a purchase at a point of sale (POS) system.

The MD payment code authorization module 315 may generate the payment code in response to receiving the mobile device identifier and the request for the transaction authorization. In some situations, the payment code may have been pre-generated and stored for future use by the MD payment code module 210-a. In some cases, the MD payment code authorization module 315 may communicate with the transaction approval module 325 of the point of sale (POS) approval code module 215-a before generating and/or transmitting the payment code. For example, the transaction approval module 325 may first determine if the user associated with the mobile device identifier received by the MD payment code authorization module 315 has one or more accounts with the payment authorization system 300 that each includes multiple forms of tender. POS approval code module 215-a may include a tender module 330 that includes multiple forms of tender that may be associated with a user's account, for example. The forms of tender included in the tender module 330 may include, but is not limited to, credit cards, debit cards, gift cards, prepaid cards, coupons, loyalty cards, and/or digital currencies.

The MD interface 305 may also receive preference information from a user through their mobile device. Preference information from the user may also be received in other ways, such as through network 115 of FIG. 1 in general. The preference information may be transmitted to a user preference module 320 of the mobile device payment code module 210-a. The user preferences module 320 may be in communication with the tender module 330 of the point of sale (POS) approval code module 215-a. The preference information, in general, may provide information regarding a number of forms of tender from the multiple forms of tender of the tender module 330 that a user may want to be applied for a given transaction.

In some cases, preference information may include general preferences and/or merchant-specific preferences. General preferences and/or merchant-specific preferences may include information regarding which forms of tender to apply to transactions. Merely by way of example, a user may provide information that the user wants a gift card utilized along with one or more coupons as a preference. The gift card may be specific to a particular merchant in some cases. In another example, a user preference may include information that a user wants a specific loyalty card along with a specific credit card utilized together. In another example, a user may provide information that the user wants all coupons utilized as a preference. In general, the user may provide two or more forms of tender as a preference of tenders to be applied to one or more transactions.

Preference information may also provide prioritizations for using the number of forms of tender. For example, the user may provide information that the user wants loyalty cards utilized before using other forms of tender. User preferences may also be merchant specific. For example, a user may provide user preferences for a first merchant that includes a first set of tender forms. The user may also provide user preferences for other merchants with other sets of tender forms.

In some situations, user preference information may be received at the user preferences module 320 when a user sets up one or more accounts. These may be referred to as preset preferences in some situations. User preference information may also be received after an account has been set up. For example, user preference information may be provided when the user requests a transaction authorization or after receiving a payment code. User information may also be provided when a point of sale (POS) system is seeking a unified authorization approval code. In some situations, user preference module 320 may utilize default settings for its user preferences. For example, a user may provide multiple forms of tender but not provide any specific preferences. User preferences module 320 may then utilize default settings.

In some situations, the transmitter module 220-a may transmit a user interface to a user of the mobile device to select preferences relating to forms of tender to be applied to one or more transactions. The user preferences module 320 may provide a role in generating the user interface. For example, the user preferences module 320 may communicate with the tender module 330 to generate queries for the user interface to help a user select preferences of forms of tender to be provided as preferences and/or to be applied to one or more transactions in general. The user interface may provide a variety of general and/or specific merchant forms of tender for the user to select through the user interface.

The user interface may be transmitted to the mobile device of the user at different times. For example, the user interface may be transmitted to the user after they have set up an account of the payment authority system 300. The user interface may be transmitted when the user is requesting a transaction authorization and providing an identifier of the user's mobile device. The user interface may be transmitted to the mobile device without the need for a request for a transaction in some cases. The mobile device payment code module 210-a may then receive the selected preferences before generating a payment code.

In other cases, the user interface request for user preferences may be transmitted to the mobile device of the user after the mobile device payment code module 210-a has generated a payment code. Merely by way of example, in requesting a transaction authorization, a user may provide information regarding a merchant for which the user wants to conduct a transaction. The user interface generated at the payment authority system 300 may provide specific preferences related to the merchant from which the user can chose.

These merchant-specific preferences may include merchant-specific coupons and/or merchant-specific loyalty cards. The user preferences presented in the user interface, however, may include other forms of tender to select from such as general forms of tender.

In other cases, the user interface may be transmitted to a user of the mobile device after the point of sale (POS) approval code module 215-a has received a transaction amount, a merchant identifier, and/or the payment code from a POS system. Again, the user interface may include general forms of tender and/or merchant-specific forms of tender. The payment authority system 300 may also transmit a prompt to a POS system associated with the merchant identifier seeking information from the POS system as to whether the POS system has additional forms of tender, such as a coupon, that the POS system may want presented as part of the user interface.

The point of sale (POS) interface 310 may be configured to receive a transaction amount, an identifier of a merchant, and the payment code from a POS system. A user of a mobile device that has received the payment code, for example, may provide the payment code to a merchant with the POS system as part of a purchase of goods or services from the merchant. The POS interface 310 may also receive other forms of information including, but not limited to merchant preferences and/or merchant forms of tender that a user may be able to utilize for a transaction. Merchant forms of tender may include, but are not limited to, merchant coupons and/or loyalty cards for the merchant. The POS interface 310 may transmit the information to the transaction approval module 325 that is part of the POS approval code module 215-a. The POS approval code module 215-a may provide an example of the POS approval code module 215 of FIG. 2. The POS approval code module 215-a may include the transaction approval module 325, the tender module 330, and/or an approval code generation module 335, for example.

The transaction approval module 325 may receive the information, such as the merchant identifier, the transaction amount, and/or the payment code, and then determine whether to approve the transaction. The transaction approval module 325 may communicate with the MD payment code authorization module 315 to determine if the payment code that the transaction approval module 325 has received is legitimate. This may include determining if the MD payment code authorization module 315 generated the payment code. In some situations, the transaction approval module 325 and/or the MD payment code authorization module 315 may determine if the merchant identifier received by the transaction approval module 325 is associated with the payment code that the transaction approval module 325 has received. The transaction approval module 325 may also communicate with the tender module 330 to determine if multiple tenders are available to apply to the transaction. In some cases, the transaction approval module 325 may check that the transaction amount it receives is an approved transaction amount. For example, a user may provide a user preference that includes certain limits on the transaction amount for any transaction and/or transaction amounts of specific merchants. The transaction approval module 325 may provide an approval for the transaction, which may then be communicated to the approval code generation module 335, which may then generate a unified approval code that applies multiple forms of tender from the tender module 330.

In some situations, the approval code generation module 335 may apply a number of forms of tender to the transaction amount received by the point of sale (POS) approval code module 215-a. The transaction approval module 325 and/or the tender module 330 may be able to apply the number of forms of tender to the transaction. In general, the number of forms of tender applied to a transaction amount includes two or more forms of tender. In some situations, all the forms of tender may be applied to the transaction amount. User preferences from the user preferences module 320, as discussed above, may also be utilized when applying the multiple forms of tender to the transaction amount. In some cases, the approval code generation module 335 may try to optimize the use of the number of forms of tender to the transaction amount. Merely by way of example, the approval code generation module 335 may be able to select different tenders, such as a group of coupons or different loyalty cards, such that a user may benefit from the multiple forms of tender. This added benefit may include a lower overall amount that a user may pay with another form of tender, such as a credit card, to complete a transaction. The optimization may also include taking into account how added points associated with a loyalty card may impact a user.

Once the multiple forms of tender have been applied to the transaction amount, the approval code generation module 335 may generate a unified approval code applying the multiple forms of tender to the transaction. The unified approval code may be transmitted to the transmitter module 220-a for transmission. In some cases, the transmitter module 220-a may transmit the unified approval code to a point of sale (POS) system, such as POS system 120 of FIG. 1. The POS system may then apply the unified approval code to the purchase being made by the customer. The unified approval code may provide instructions to the POS system such that the POS system may apply the multiple different forms of tender to the transaction. In some situations, the approval code generation module 335 may provide an updated unified approval code to the POS system. For example, this may occur when additional forms of tender may be selected by a user and/or provided by a merchant after the initial unified approval code is generated.

The point of sale (POS) approval code module 215-a, utilizing the transaction approval module 325, the tender module 330, and/or the approval code generation module 335, may be configured to automatically apply multiple forms of tender to the transaction amount according to preset preferences of a user of the mobile device. For example, a user may have provided information to the payment authority system 300 providing the user's preferences with regard to the different forms of tender the user would like applied for one or more different types of transactions. These preferences generally involve multiple forms of tender that either the user or another, such as a merchant or the POS system, for example, have provided that are associated with the user's account. In some cases, these preferences are preset preferences which may be provided before a transaction with a merchant has occurred.

As discussed above, the transmitter module 220-a may transmit a user interface to a user of the mobile device to select preferences relating to forms of tender to be applied to one or more transactions. This user interface may be transmitted to the mobile device of the user, for example, when the user is requesting a transaction authorization and providing an identifier of the user's mobile device. The user interface may be transmitted to the mobile device without the need for a request for a transaction in some cases. The user preferences module 320 may then receive the selected preferences before generating a payment code. In other cases, the user interface may be transmitted to the mobile device of the user after the mobile device payment code module 210-a has generated a payment code. For example, the user interface may be transmitted to a user of the mobile device after the point of sale (POS) approval code module 215-a has received a transaction amount, a merchant identifier, and the payment code from a POS system. The POS approval code module 215-a, utilizing the transaction approval module 325, the tender module 330, and/or the approval code generation module 335, may apply the multiple forms of tender to the transaction amount according to selected preferences. The approval code generation module 335 may then generate a unified approval code based on the user's selected preferences.

The approval code generation module 335 may utilize preferences of a merchant in applying the multiple forms of tender to a transaction amount in some cases. For example, a merchant may offer an additional form of tender to the user of the mobile device in response to receiving the merchant identifier and according to preset preferences of the merchant. In some situations, these merchant preferences may be presented to the user as part of the user interface. The approval code generation module 335 may apply different forms of tender to a transaction amount. The multiple forms of tender may include, but are not limited to, a credit card, a debit card, a gift card, a prepaid card, a coupon, a digital current, and/or a loyalty card.

In some cases, when the approval code generation module 335 generates a unified approval code applying the multiple forms of tender such that the result may be an amount less than the transaction amount. In some cases, there may be a remainder due. The point of sale (POS) approval code module 215-a may generate a message to send to a POS system prompting a merchant to request an additional form of tender from a customer to complete a transaction.

Figure 4:
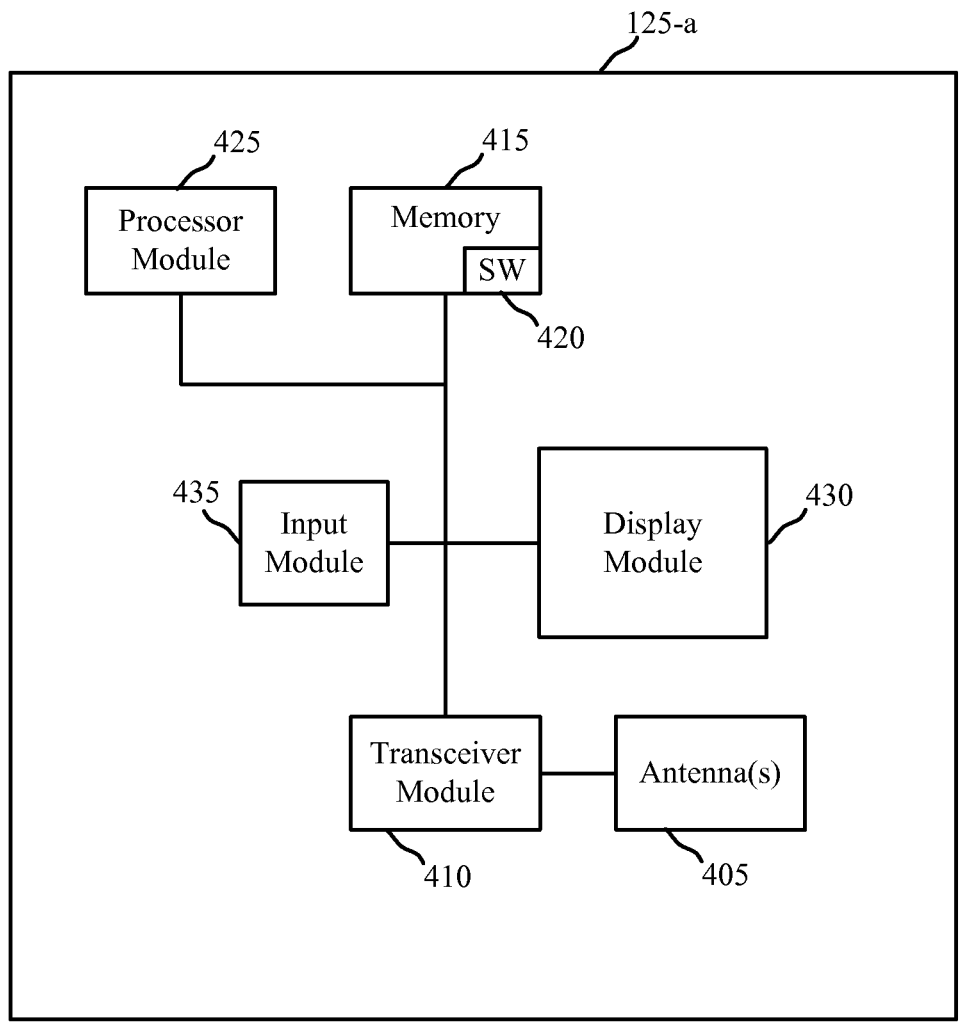
FIG. 4 is a block diagram of a mobile device in accordance with various embodiments.

FIG. 4 is a block diagram 400 of a mobile device, such as the mobile device 125 of FIG. 1, in communication with a payment authority system, such as the payment authority system 105 of FIG. 1, and/or a point of sale (POS) system, such as the POS system 120 of FIG. 1. The mobile device 125-a may have any number of different configurations, such as personal computers (e.g., laptop computers, netbook computers, tablet computers, etc.), cellular telephones, PDAs, digital video recorders (DVRs), internet appliances, gaming consoles, e-readers, etc. The mobile device 125-a may have a mobile configuration, having an internal power supply (not shown), such as a small battery, to facilitate mobile operation.

The mobile device 125-a includes antenna(s) 405, a transceiver module 410, memory 415, and a processor module 425, which each may be in communication, directly or indirectly, with each other (e.g., via one or more buses). The transceiver module 410 may be configured to communicate bi-directionally, via the antennas 405 and/or one or more wired or wireless links, with one or more networks, as described above. While the mobile device 125-a may include a single antenna, the mobile device 125-a will typically include multiple antenna(s) 405 for multiple links. The mobile device 125-a may also include a display module 430 for displaying information to a user and an input module 435, such as a keyboard, for receiving input from a user.

The memory 415 may include random access memory (RAM) and read-only memory (ROM). The memory 415 may store computer-readable, computer-executable software code 420 containing instructions that are configured to, when executed, cause the processor module 425 to perform various functions described herein (e.g., call processing, database management, message routing, etc.). Alternatively, the software 420 may not be directly executable by the processor module 425 but be configured to cause the computer, e.g., when compiled and executed, to perform functions described herein. In some embodiments, memory 415 and/or software 420 may include applications received from a payment authority system that may be utilized in accordance with various embodiments.

The processor module 425 may include an intelligent hardware device, e.g., a central processing unit (CPU) such as those made by Intel® Corporation or AMD®, a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision of withholding/suppression of the packet itself providing the indication of whether a user is speaking.

The processor module 425 may be configured to create a transaction authorization request and mobile device identifier that may be transmitted from the transceiver module 410. The transceiver module 410 may then receive a payment code in response to transmitting the request for authorization. A user may then provide the payment code to a point of sale (POS) system, such as system 120 of FIG. 1, of a merchant; the point of sale (POS) system may then utilize the payment code to receive a unified approval code for a transaction from a payment authority system, such as payment authority system 105 of FIG. 1. In some situations, the processor module 425, the transceiver module 410, and/or other components of mobile device 125-a may be configured to transmit the payment code to the POS system. These components may also be configured to receive information from the POS system, such as specific requests for additional forms of tender and/or different offers from the merchant such as coupons that may be utilized as part of the transaction and that may be utilized as an additional form of tender that the payment authority system may apply as part of a unified approval code.

The processor 425 and/or transceiver 410 may be configured to receive user interfaces from the payment authority system and/or the point of sale (POS) system. These interfaces may be displayed on display module 430. Through input devices such as input module 435, a user may select different user preferences or choices based on the user interfaces. These preferences and/or choices may then be transmitted from transceiver module 410 to the payment authority system and/or POS system. These user interfaces, as discussed above with respect to the payment authority system, may be presented to a user through the mobile device 125-a at different times including, merely by way example, before a transaction authorization request is sent, after a transaction authorization is sent, after a payment code is received, and/or after a payment code is provided to a POS system.

In some embodiments, transceiver module 410 and/or processor module 425 may receive a unified payment code from a payment authority system. A unified payment code may have similarities to a unified approval code that may be sent to a point of sale (POS) system. In this case, the mobile device 125-a may receive the unified payment code that is formatted to apply multiple forms of tender to a transaction. The multiple forms of tender applied with the unified payment code may have been selected by the user through the mobile device 125-a as discussed above in general with regard to user interfaces. A user and/or the mobile device 125-a may provide and/or transmit this unified payment code to a POS system as part of a transaction, for example. The POS system may send the unified payment code along with a transaction amount, and/or a merchant identifier to a payment authority. Since the unified payment code has already applied the multiple forms of tender, the payment authority system may not have to determine what forms of tender to apply to the transaction as that information has already been determined. In some cases, however, the payment authority system may update the information, for example, if the mobile device 125-a has changed and/or updated user preferences.

Figure 5:
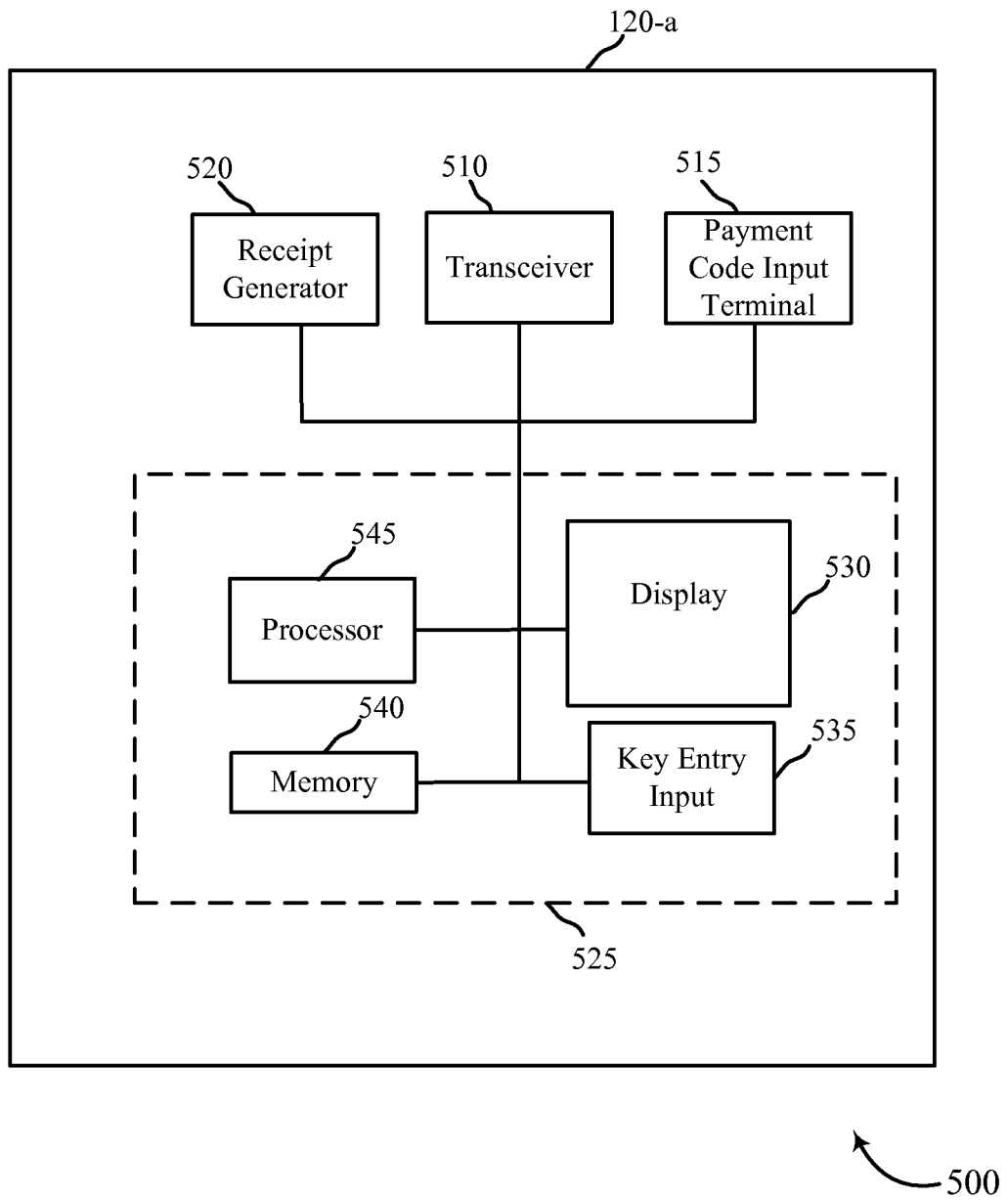
FIG. 5 is a block diagram of a point of sale (POS) system in accordance with various embodiments.

FIG. 5 shows a block diagram 500 of a point of sale (POS) system 120-a in accordance with various embodiments. This system 120-a may be in whole or in part of the POS system 120 of FIG. 1. Some embodiments may utilize more or less components than that shown in system 120-a. System 120-a may include numerous components including, but not limited to, a transaction terminal 525, a payment code input terminal 515, a transceiver 510, and/or a receipt generator 520. The transaction terminal 525 may include different components such as a display 530, a key entry input device 535, a processor 545, and/or one or more memories 540. These different components may be coupled with each other such that they may communicate with each other or other devices, systems, and/or networks.

Transaction terminal 525 may include a microprocessor or logic to process, display and print information about a transaction. The information may come from multiple sources, including key entry input 535 on terminal 525. For example, product information, such as a SKU#, serial number, inventory number, etc., may be typed into the transaction terminal 525 through key entry input 535. Transaction terminal 525 may also be utilized to enter payment codes received from a user, generate transactions amounts, and provide merchant identifiers that may be transmitted to a payment authority system, such as system 105 of FIG. 1, in accordance with various embodiments.

Information may further be received and/or generated by a payment code input terminal 515. The payment code input terminal 515 may be capable of reading information like the payment code from a customer's mobile device, such as the mobile device 125 of FIG. 1. The payment code input terminal 515 may receive information utilizing contactless means including near-field communication technology or other known wireless technologies, for example. The payment code input terminal 515 may also be configured with a key entry input for receiving information such as payment codes from a user.

The point of sale (POS) system 120-a may include a device 510, which may be a transceiver or other device capable of transmitting and/or receiving information that may facilitate communication between system 120-a, and one or more networks, such as network 115 of FIG. 1. Device 510 may be configured to transmit information to a payment authority system, such as the payment authority system 105 of FIG. 1. For example, device 510 may transmit a payment code, a merchant identifier, and/or a transaction amount to the payment authority system when a customer provides the payment code and is seeking to make a transaction with a merchant associated with the POS system 120-a. The device 510 may also transmit information, including forms of tender, to the payment authority system. As discussed above with respect to the payment authority systems disclosed and the mobile devices disclosed, a POS system may send one or more coupons or other offers to the payment authority system or the mobile device. These forms of tender may be utilized by the payment authority system as an additional form of tender that may be applied to a transaction as part of a unified approval payment. Merely by way of example, when a customer presents a payment code to the merchant and the payment code is captured by the POS system 120-a, the processor 545 may generate information that may be transmitted to the mobile device of the user in the form of a user interface providing additional preferences and/or choices of a user to make. In some cases, this information may be presented on the display 530. These preferences and/or choices may include whether to utilize a coupon or other discount provided by the merchant through the POS system 120-a. These additional forms of tender may then be transmitted to the payment authority system if a user of the mobile device chooses to utilize them.

The device 510, for example, may also receive a unified approval code that was generated by a payment authority system, such as the payment authority system 105 of FIG. 1. The device 510 may then forward the code to transaction terminal 525. If necessary, the device 510 may translate the data received from a network, such as network 115 of FIG. 1, into a format compatible with the other components of system 120-a (e.g., transaction terminal 525, payment code input terminal 515, etc.). The device 510 may also facilitate the communication of payment codes and/or approval codes between network 115, payment authority system 105, mobile device 125, and/or components of system 120-a. To do so, the device 510 may have a processor and/or logic to utilize unified approval codes applying multiple forms of tender to a transaction amount. In some cases, transaction terminal may be configured to receive and utilize unified approval codes applying multiple forms of tender to a transaction amount. In some embodiments, the device 510 includes a processor, which may be a micro processor or the like, coupled to a memory. The memory maintains appropriate software for the operation of the device 510 including the operation of the device 510 during one or more financial transactions. For example, the software or logic in the device 510 may operate to select the appropriate network, such as network 115, with which to communicate.

The point of sale (POS) system 120-*a* may utilize the unified approval code applying multiple forms of tender to a transaction amount in a variety of ways. For example, the device 510 and/or the processor 545 may utilize the unified approval code to determine and/or itemize the specific portions of the transaction amount that specific forms of tender may be applied. The receipt generator 520 may be utilized to provide a receipt for the transaction that includes the information regarding application of each form of tender to the transaction amount. In some cases, the POS system 120-*a* may create and provide an electronic receipt. Note also that the payment authority system, such as payment authority system 105 of FIG. 1, may also generate an electronic receipt or other form of presentation of how the multiple forms of tender may have been applied to the transaction amount. The payment authority system may thus provide an electronic receipt.

In some cases, when the point of sale (POS) system 102-*a* utilizes the unified approval code applying the multiple forms of tender. The multiple forms of tender may provide an amount that is less than the transaction amount. There may then be an additional amount remaining. The POS system 120-*a* may transmit, such as through the device 510, a request for an additional form of tender. This request may also be displayed on the display 530. The POS system 102-*a* may then accept another form of tender directly from the user for example. In some cases, the payment authority system may provide this additional form of tender. A transaction may then be completed.

A merchant may also store preset preferences of the merchant on the point of sale (POS) system 120-*a*, such as on memory 540. Such preferences may include providing different forms of tender, such as coupons and/or loyalty cards, for a customer to utilize for a transaction. These forms of tender may be transmitted through the device 510 to the payment authority system. In some cases, these preferences of the merchant may be automatically applied as part of the multiple forms of tender applied in generating a unified approval code by the payment authority system.

Figure 6:
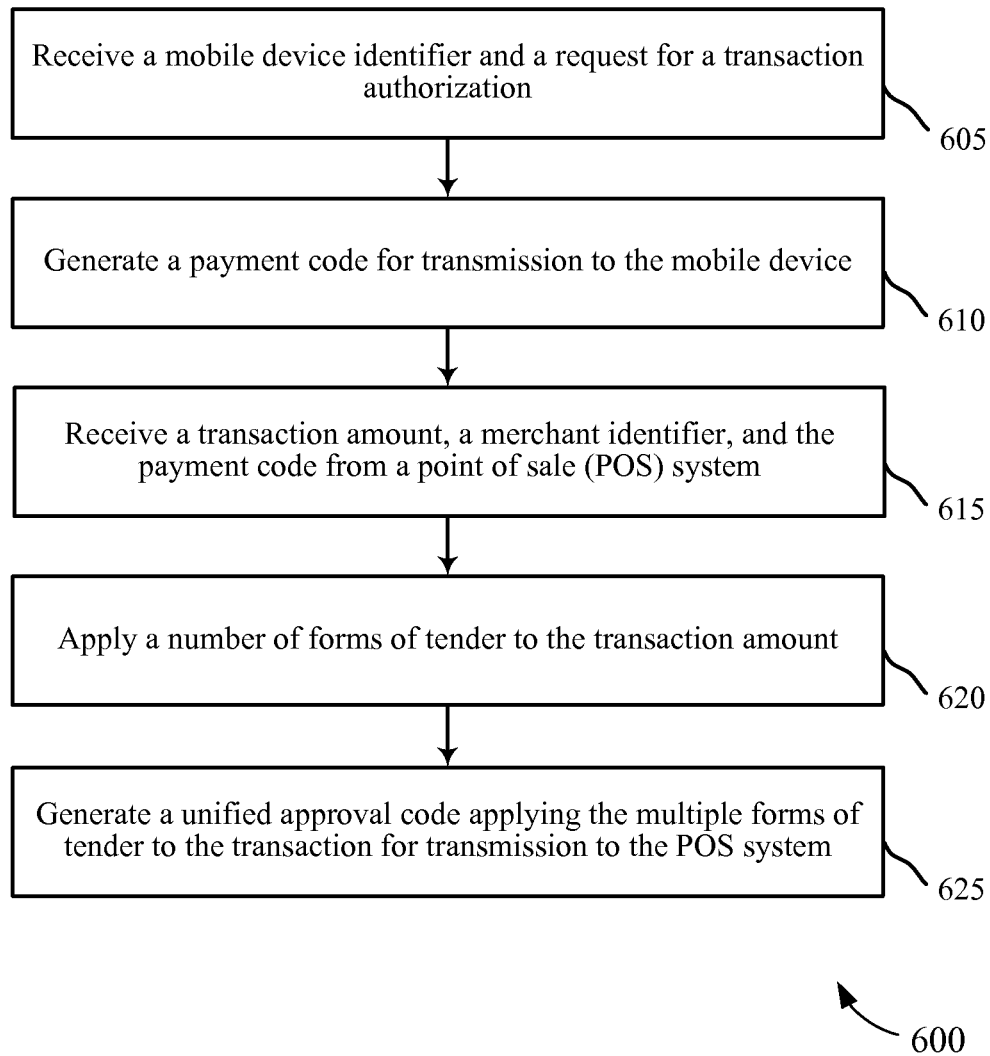
FIG. 6 is a flow chart of a method for mobile device transaction approvals utilizing a payment authority system in accordance with various embodiments.

FIG. 6 is a flow chart of a method 600 for performing a mobile device transaction approval applying multiple forms of tender. The method 600 may be performed, in whole or in part, by the payment authority system 105 of FIG. 1, the payment authority system 200 of FIG. 2, or the payment authority system 300 of FIG. 3.

At block 605, an identifier of a mobile device and a request for a transaction authorization may be received. In some embodiments, information identifying a merchant is also received. At block 610, a payment code for transmission to the mobile device may be generated in response to receiving the mobile device identifier and the request for the transaction authorization. At block 615, a transaction amount, an identifier of a merchant, and the payment code from a point of sale (POS) system may be received. At block 620, a number of forms of tender may be applied to the transaction amount. At block 625, a unified approval code applying the multiple forms of tender to the transaction may be generated for transmission to the POS system.

In some embodiments of method 600, applying the multiple forms of tender to the transaction amount includes automatically applying the forms of tender to the transaction amount according to preset preferences of a user of the mobile device. A user interface may be transmitted to a user of the mobile device to select preferences relating to forms of tender to be applied. The selected preferences may be received from the user of the mobile device. Applying the multiple forms of tender to the transaction amount may include applying the multiple forms of tender to the transaction amount according to selected preferences. Transmitting the user interface may occur in response to receiving the request. Receiving selected preferences may occur before generating the payment code.

In some embodiments of method 600, applying the multiple forms of tender to the transaction amount includes automatically applying the multiple forms of tender to the transaction amount at least in part according to preset preferences of the merchant. An additional form of tender may be offered to the user of the mobile device in response to receiving the merchant identifier and according to preset preferences of the merchant. In some embodiments, the unified approval code applying the multiple forms of tender to the transaction results in an amount less than the transaction amount and an additional amount due.

In some embodiments of method 600, the multiple forms of tender may include a credit card, a debit card, a gift card, a prepaid card, a coupon, and/or loyalty card. In some cases, the payment code and the unified approval code are transmitted to the mobile device from the payment authority system.

Figure 7:
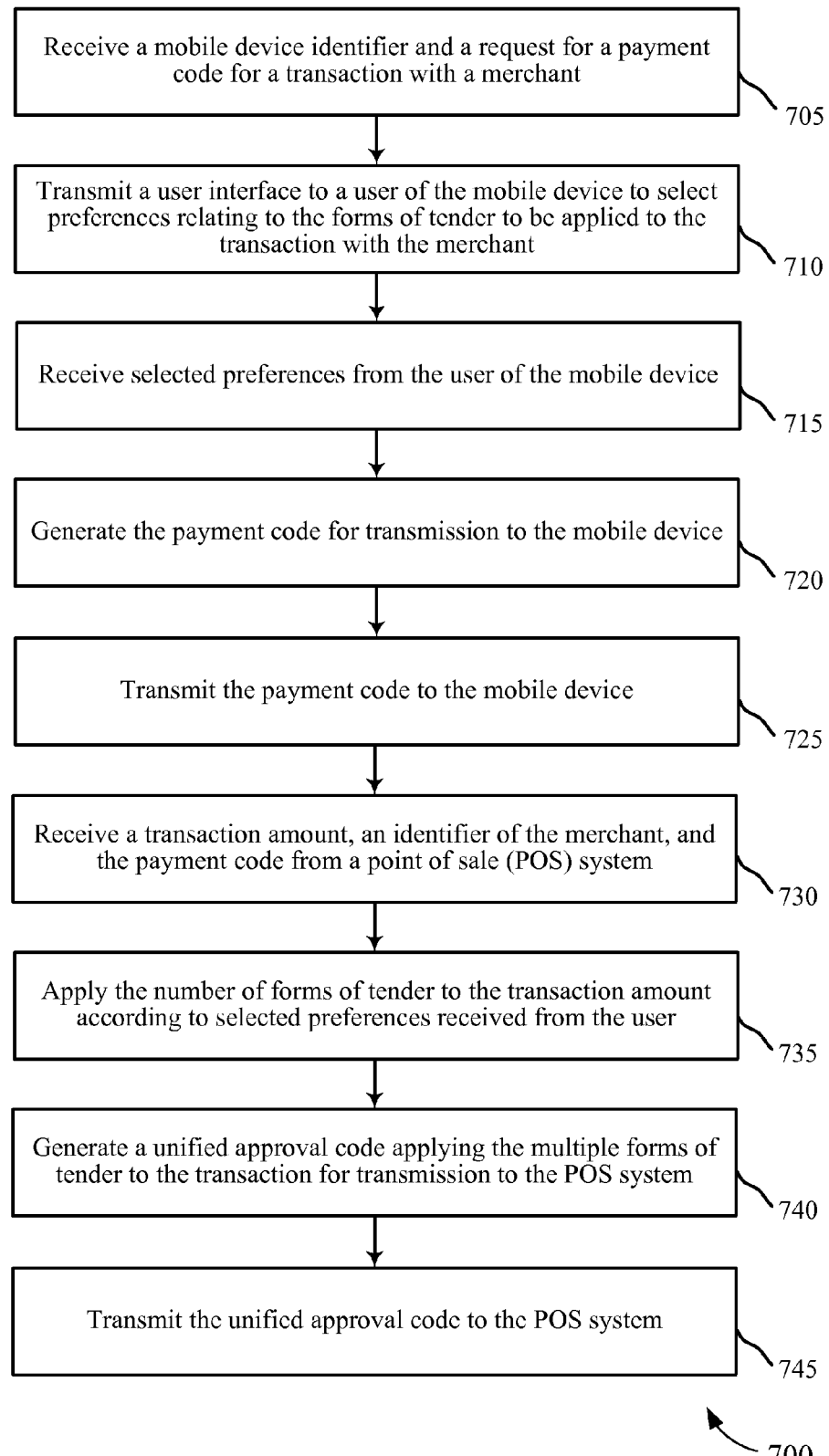
FIG. 7 is a flow chart of a method for mobile device transaction approvals utilizing a payment authority system in accordance with various embodiments.

FIG. 7 is flow chart of a method 700 of mobile device transaction approvals applying multiple forms of tender. The method 700 may be performed, in whole or in part, by the payment authority system 105 of FIG. 1, the payment authority system 200 of FIG. 2, or the payment authority system 300 of FIG. 3.

At block 705, a mobile device identifier and a request for a payment code for a transaction with a merchant may be received. At block 710, a user interface may be transmitted to a user of the mobile device to select preferences relating to the forms of tender to be applied to the transaction with the merchant. At block 715, selected preferences may be received from the user of the mobile device. At block 720, the payment code for transmission to the mobile device may be generated. At block 725, the payment code may be transmitted to the mobile device. At block 730, transaction amount, an identifier of the merchant, and the payment code may be received from a point of sale (POS) system. At block 735, multiple forms of tender may be applied to the transaction amount according to selected preferences received from the user. At block 740, a unified approval code applying the multiple forms of tender to the transaction may be generated for transmission to the POS system. At block 745, the unified approval code may be transmitted to the POS system.

Figure 8:
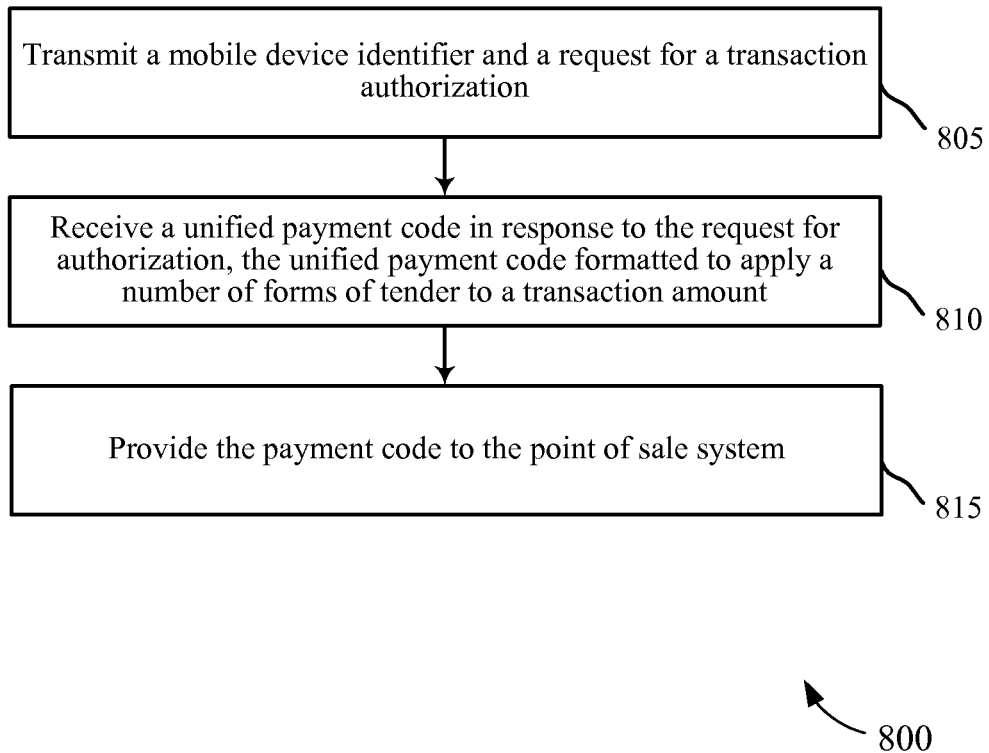
FIG. 8 is a flow chart of a method for mobile device transaction approvals utilizing a mobile device in accordance with various embodiments.

FIG. 8 is flow chart of a method 800 of mobile device approval applying multiple forms of tender. The method 800 may be performed, in whole or in part, by mobile device 125 of FIG. 1 or the mobile device 125-*a* of FIG. 4, for example.

At block 805, a transaction authorization request and a mobile device identifier may be transmitted. At block 810, a unified payment code may be received in response to the request for authorization. The unified payment code may be formatted to apply multiple forms of tender to a transaction amount. In some cases, the unified payment code may be utilized by other devices and/or systems, such as a point of sale (POS) system and/or a payment authority system to apply the multiple forms of tender to the transaction. The unified payment code may be provided to a POS system at block 815.

In some embodiments of method 800, preset preferences for applying the multiple forms of tender are transmitted from the user of the mobile device. In some situations, in response to transmitting the request for the transaction authorization, a user interface identifying options for selecting preferences relating to forms of tender to be applied may be received. Selected preferences may then be transmitted from the user of the mobile device. The options for selecting preferences may include forms of tender that a user has previously provided to a payment authority system. The options for selecting preferences may include forms of tender provided by a merchant for a transaction associated with the transaction amount.

Figure 9:
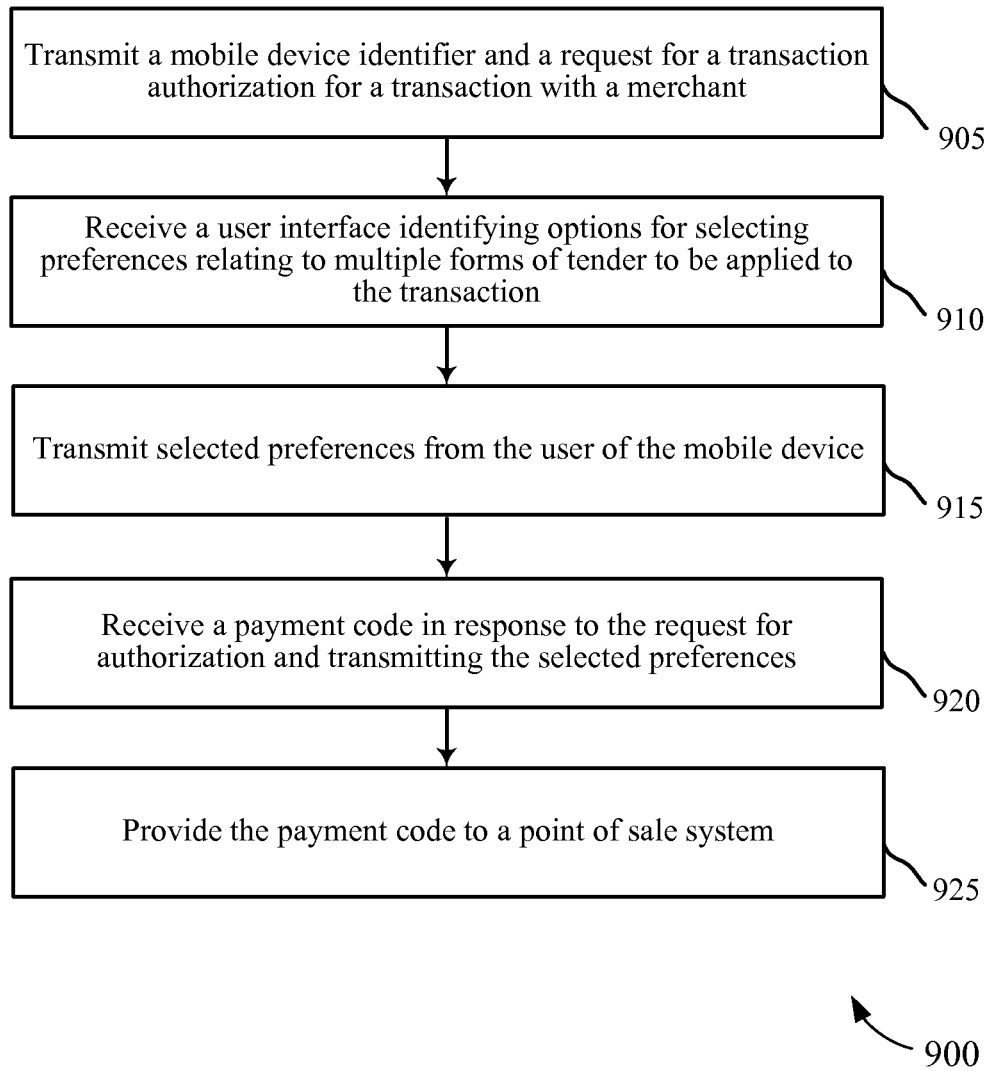
FIG. 9 is a flow chart of a method for mobile device transaction approvals utilizing a mobile device in accordance with various embodiments.

FIG. 9 is flow chart of a method 900 of a mobile device approval applying multiple forms of tender. The method 900 may be performed, in whole or in part, by mobile device 125 of FIG. 1 or the mobile device 125-*a* of FIG. 4, for example.

At block 905, a mobile device identifier and a request for a transaction authorization for a transaction with a merchant may be transmitted. At block 910, a user interface identifying options for selecting preferences relating to multiple forms of tender to be applied to the transaction may be received. At block 915, one or more selected preferences from the user of the mobile device may be transmitted. At block 920, a payment code in response to the request for authorization and transmitting the selected preferences may be received. At block 925, the payment code may be provided to a POS system.

Figure 10:
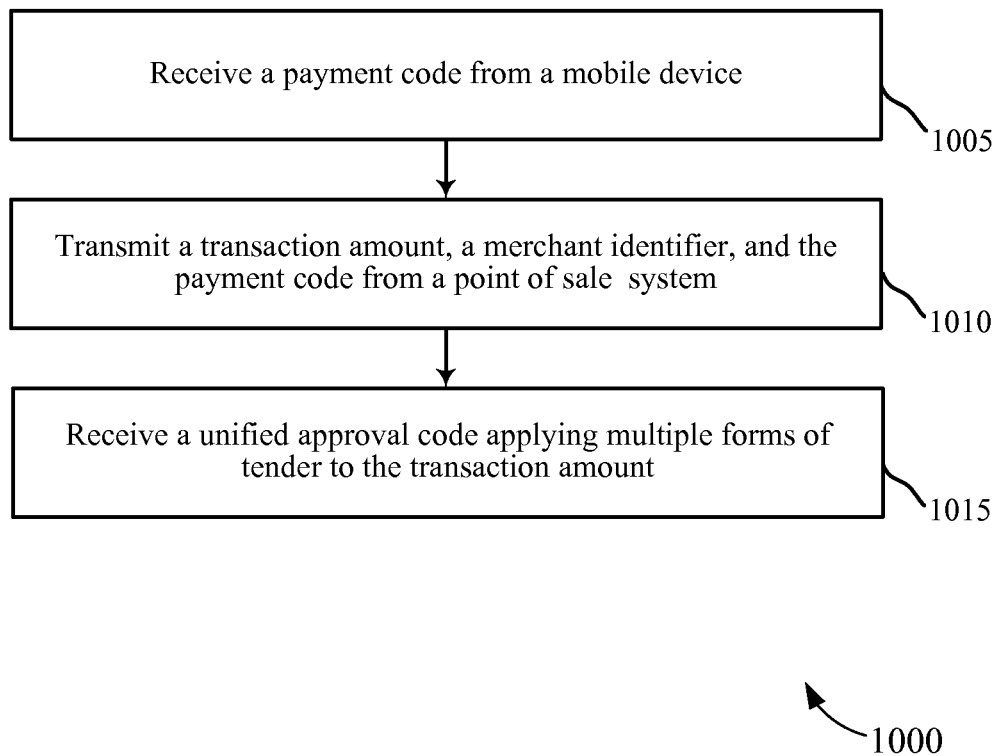
FIG. 10 is a flow chart of a method for mobile device transaction approvals utilizing a point of sale (POS) system in accordance with various embodiments.

FIG. 10 is flow chart of a method 1000 of mobile device transaction approval applying multiple forms of tender. The method 1000 may be performed, in whole or in part, by the point of sale (POS) system 120 of FIG. 1 or POS system 120-*a* of FIG. 5, for example.

At block 1005, a payment code may be received from a user of a mobile device. At block 1010, a transaction amount, a merchant identifier, and the payment code from a point of sale (POS) system may be transmitted. At block 1015, a unified approval code applying the multiple forms of tender to the transaction amount may be received.

In some embodiments of method 1000, the unified approval code applying the multiple forms of tender to the transaction may be for an amount less than the transaction amount and an additional amount may be due. In some situations, a request for an additional form of tender may be transmitted and received to cover the additional amount due. The unified approval code applying the multiple forms of tender to the transaction may be for an amount less than the transaction amount due to an application of a discount. Applying the multiple forms of tender to the transaction amount may include automatically applying the multiple forms of tender to the transaction amount at least in part according to preset preferences of the merchant associated with the point of sale (POS) system. In some situations, the unified approval code may be utilized to apply the multiple forms of tender to the transaction amount such that a receipt may be provided to a user of the mobile device itemizing the application of each of the multiple forms of tender to the transaction amount.

Figure 11:
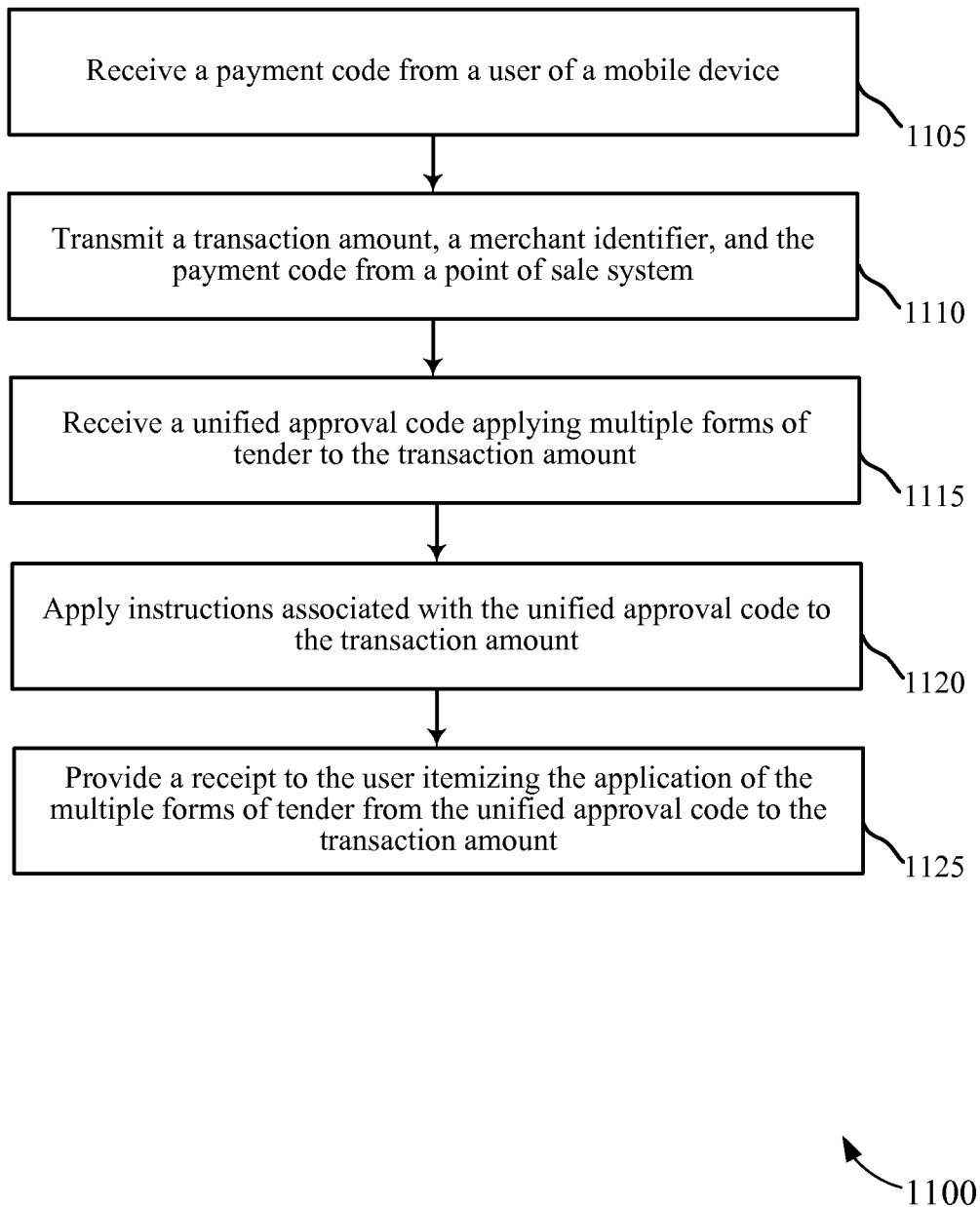
FIG. 11 is a flow chart of a method for mobile device transaction approvals utilizing a point of sale (POS) system in accordance with various embodiments.

FIG. 11 is a flow chart of a method 1100 of mobile device transaction approval applying multiple forms of tender. The method 1100 may be performed, in whole or in part, by the point of sale (POS) system 120 of FIG. 1 or POS system 120-*a* of FIG. 5, for example.

At block 1105, a payment code may be received from a user of a mobile device. At block 1110, a transaction amount, a merchant identifier, and the payment code may be transmitted from a point of sale system. At block 1115, a unified approval code applying multiple forms of tender to the transaction amount may be received. At block 1120, instructions associated with the unified approval code may be applied to the transaction amount. At block 1125, a receipt may be provided to the user itemizing the application of the multiple forms of tender from the unified approval code to the transaction amount. The receipt may be in electronic and/or paper form.

The functionality of the different components of different embodiments, including payment authority system 105 of FIG. 1, the POS system 120 of FIG. 1, the mobile device 125 of FIG. 1, the payment authority system 200 of FIG. 2, the payment authority system 300 of FIG. 3, the mobile device 125-*a* of FIG. 4, and/or the point of sale (POS) system 120-*a* of FIG. 5 may be implemented in whole or in part with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 12:
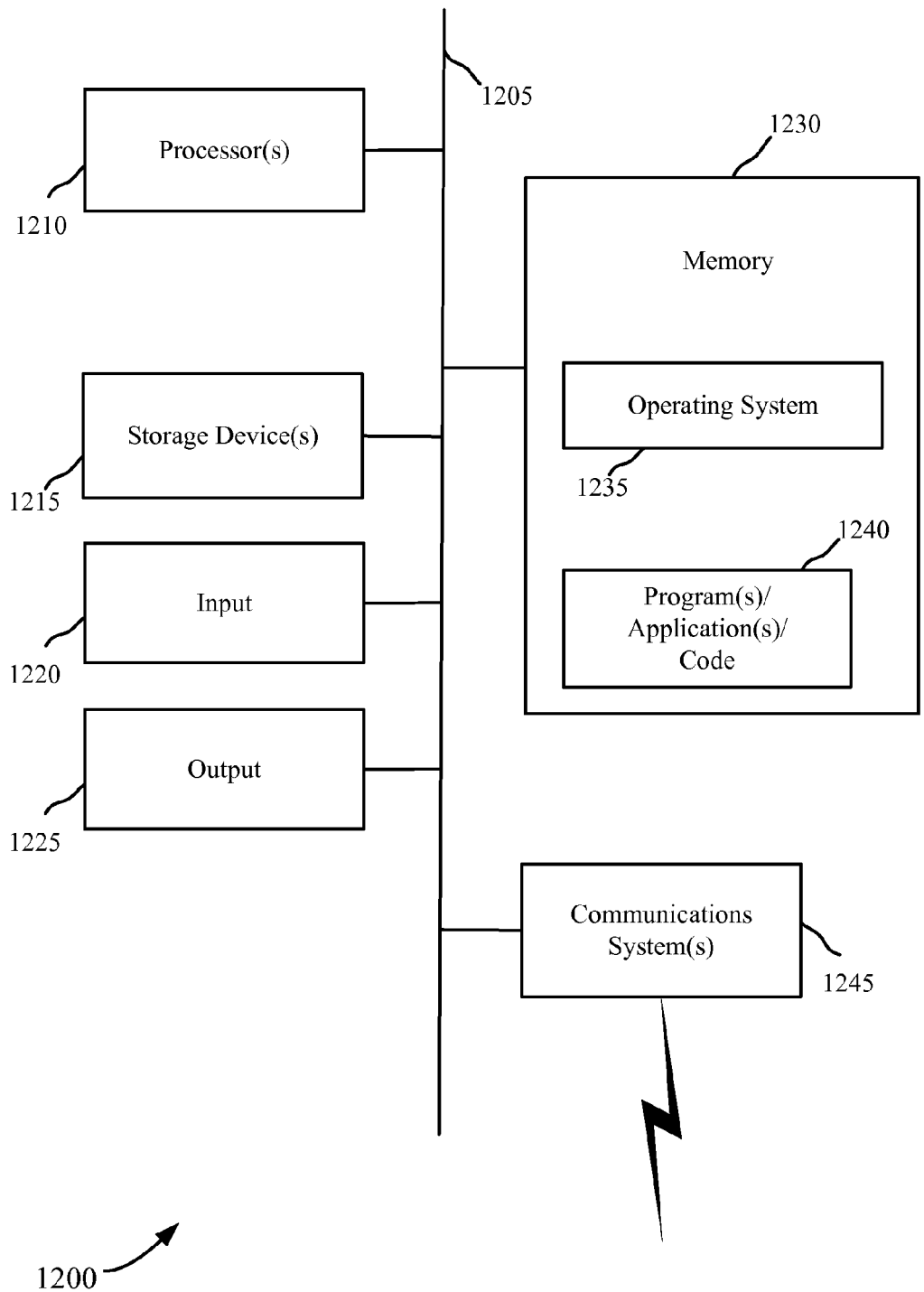
FIG. 12 is a block diagram of a computer device structure in accordance with various embodiments.

A device structure 1200 that may be used for the payment authority system 105 of FIG. 1, the point of sale (POS) system 120 of FIG. 1, the mobile device 125 of FIG. 1, or other computing devices described herein, is illustrated with the schematic diagram of FIG. 12. This drawing broadly illustrates how individual system elements of each of the aforementioned devices may be implemented, whether in a separated or more integrated manner. The exemplary structure shown is comprised of hardware elements that are electrically coupled via bus 1205, including processor(s) 1210 (which may further comprise a DSP or special-purpose processor), storage device(s) 1215, input device(s) 1220, and output device(s) 1225. The storage device(s) 1215 may be a machine-readable storage media reader connected to any machine-readable storage medium, the combination comprehensively representing remote, local, fixed, or removable storage devices or storage media for temporarily or more permanently containing computer-readable information. The communications system(s) interface 1245 may interface to a wired, wireless, or other type of interfacing connection that permits data to be exchanged with other devices. The communications system(s) 1245 may permit data to be exchanged with a network.

The structure 1200 may also include additional software elements, shown as being currently located within working memory 1230, including an operating system 1235 and other code 1240, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of mobile device transaction approval, the method comprising:
   receiving, at a payment authority server, a mobile device identifier of a mobile device and a request for a transaction authorization;
   generating, at the payment authority server, a payment code for the mobile device based on the mobile device identifier and the request for the transaction authorization, wherein the payment code corresponds to a plurality of forms of tender associated with the mobile device identifier at the payment authority server;
   transmitting the payment code to the mobile device;
   receiving, at the payment authority server, a transaction amount, a merchant identifier of a merchant, and the payment code from a point of sale (POS) system;
   applying, at the payment authority server, the plurality of forms of tender to the transaction amount;
   generating, at the payment authority server, a unified approval code for transmission to the POS system, the unified approval code instructing the POS system to apply funds from the multiple forms of tender to the transaction; and
   transmitting the unified approval code to the POS system.

2. The method of claim 1, wherein applying the plurality of forms of tender to the transaction amount comprises:
   automatically applying the plurality of forms of tender to the transaction amount according to preset preferences of a user of the mobile device.

3. The method of claim 1, further comprising:
   transmitting a user interface to a user of the mobile device to select preferences relating to forms of tender to be applied; and
   receiving selected preferences from the user of the mobile device,
   wherein applying the plurality of forms of tender to the transaction amount comprises applying the plurality of forms of tender to the transaction amount according to selected preferences.

4. The method of claim 3, wherein,
   transmitting the user interface comprises transmitting the user interface in response to receiving the request for a transaction authorization; and
   receiving the selected preferences occurs before generating the payment code.

5. The method of claim 1, wherein applying the plurality of forms of tender to the transaction amount comprises:
   automatically applying the plurality of forms of tender to the transaction amount at least in part according to preset preferences of the merchant.

6. The method of claim 5, further comprising:
   offering an additional form of tender to the user of the mobile device in response to receiving the merchant identifier and according to preset preferences of the merchant.

7. The method of claim 1, wherein the plurality of forms of tender include at least a credit card, a debit card, a gift card, a prepaid card, a coupon, a digital currency, or a loyalty card.

8. The method of claim 1, wherein the unified approval code applying the plurality of forms of tender to the transaction results in an amount less than the transaction amount, and an additional amount remains due.

9. The method of claim 1, wherein the request for the transaction authorization comprises information identifying the merchant.

10. A payment authority server for mobile device transaction approvals, the system comprising:
    at least one processor; and
    a memory communicatively coupled with the at least one processor, wherein the memory stores code configured to cause the at least one processor to:
    receive a mobile device identifier of a mobile device and a request for a transaction authorization;
    generate a payment code for the mobile device based on the mobile device identifier and the request for the transaction authorization, wherein the payment code corresponds to a plurality of forms of tender associated with the mobile device identifier at the payment server;
    transmit the payment code to the mobile device;
    receive a transaction amount, a merchant identifier of a merchant, and the payment code from a point of sale (POS) system;
    apply the plurality of forms of tender to the transaction amount;
    generate a unified approval code for transmission to the POS system, the unified approval code instructing the POS system to apply funds from the multiple forms of tender to the transaction; and
    transmit the unified approval code to the POS system.

11. The payment authority server claim 10, wherein the code is further configured to cause the at least one processor to:
- automatically apply the plurality of forms of tender to the transaction amount according to preset preferences of a user of the mobile device.

12. The payment authority server of claim 10, wherein the code is further configured to cause the at least one processor to:
- transmit a user interface to a user of the mobile device to select preferences relating to forms of tender to be applied; and
- receive selected preferences from the user of the mobile device,
- wherein applying the plurality of forms of tender to the transaction amount comprises applying the plurality of forms of tender to the transaction amount according to selected preferences.

13. The payment authority server of claim 12, wherein the code is further configured to cause the at least one processor to:
- transmit the user interface in response to receiving the request for a transaction authorization; and
- receive the selected preferences before generating the payment code.

14. The payment authority server of claim 10, wherein the code is further configured to cause the at least one processor to automatically apply the plurality of forms of tender to the transaction amount at least in part according to preset preferences of the merchant.

15. The payment authority server of claim 14, wherein the code is further configured to cause the at least one processor to:
- offer an additional form of tender to the user of the mobile device in response to receiving the merchant identifier and according to preset preferences of the merchant.

* * * * *